United States Patent
Zhao

(10) Patent No.: US 11,533,544 B2
(45) Date of Patent: Dec. 20, 2022

(54) SYSTEMS AND METHODS FOR SMART CONTENT STREAMING

(71) Applicant: Comcast Cable Communications, LLC, Philadelphia, PA (US)

(72) Inventor: Zhen Zhao, Berwyn, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/728,977

(22) Filed: Dec. 27, 2019

(65) Prior Publication Data

US 2021/0204036 A1   Jul. 1, 2021

(51) Int. Cl.
*H04L 67/63*       (2022.01)
*H04N 21/64*       (2011.01)
*H04N 21/4147*     (2011.01)
*H04N 21/4402*     (2011.01)
*H04N 21/442*      (2011.01)
*H04N 21/643*      (2011.01)

(52) U.S. Cl.
CPC ............ *H04N 21/64* (2013.01); *H04L 67/63* (2022.05); *H04N 21/4147* (2013.01); *H04N 21/44029* (2013.01); *H04N 21/44204* (2013.01); *H04N 21/64322* (2013.01)

(58) Field of Classification Search
CPC ............ H04N 21/64; H04N 21/4147; H04N 21/44029; H04N 21/44204; H04N 21/64322
USPC ........................................................ 709/219
See application file for complete search history.

(56) References Cited

U.S. PATENT DOCUMENTS

| | | | | |
|---|---|---|---|---|
| 2002/0091926 A1* | 7/2002 | Fukutomi | ............... | H04L 12/18 713/170 |
| 2006/0209729 A1* | 9/2006 | Staniec | ................ | H04H 20/103 370/270 |
| 2009/0238183 A1* | 9/2009 | Wu | .......................... | H04L 45/16 370/390 |
| 2010/0098083 A1* | 4/2010 | Yamazaki | ........... | H04L 12/2876 370/392 |
| 2014/0304221 A1* | 10/2014 | Perkins | .............. | G06Q 10/0633 707/609 |

OTHER PUBLICATIONS

InetDaemon.Com, "IP Datagram Structure", 2018, internet (https://www.inetdaemon.com/tutorials/internet/ip/datagram_structure.shtml), p. 1-3 (Year: 2018).*

* cited by examiner

*Primary Examiner* — Jeffrey R Swearingen
(74) *Attorney, Agent, or Firm* — BakerHostetler

(57) ABSTRACT

Systems and methods for providing an authenticated group-cast stream of content to destination receivers are disclosed. A method may include receiving information indicating that a media capturing source(s) located at a premises and destination receivers are included in a group. Content captured from a media capturing source(s) may be received. The content may include an image(s)/video(s) and a destination network address associated with the destination receivers. The content may be copied. The number of copies of content may correspond to a number of the destination receivers. A respective copy of the content may be sent to the destination receivers.

21 Claims, 15 Drawing Sheets

| Group IP Addresses in the destination | Individual destination IP Addresses |
|---|---|
| 172.168.0.233 | 69.252.80.75 |
| 172.168.0.233 | 96.114.14.140 |
| 172.168.0.233 | 71.230.36.162 |
| 172.168.0.235 | 68.87.41.40 |

FIG. 6

| Group IP in the destination | Individual destination IPs |
|---|---|
| 172.168.0.233 | 69.252.80.75 |
| 172.168.0.233 | 96.114.14.140 |
| 172.168.0.233 | 71.230.36.162 |
| 172.168.0.236 | 68.87.41.40 |

SYSTEMS AND METHODS FOR SMART CONTENT STREAMING

BACKGROUND

In some conventional wireless systems, entities associated with a home network may request content captured from cameras of the home. The cameras of the home typically need to simultaneously provide multiple streams of the same captured content to requesting entities. However, home cameras generating and sending multiple copies of the same content streams simultaneously to different requesting entities may undesirably drain and consume computing resources such as processing and memory capacity of the cameras. The draining of the computing resources of the cameras may slowdown operation of the cameras resulting in an undesirable user experience (e.g., lag, distorted images/videos, etc.). In view of these and other shortcomings, there is a need for an improved system.

SUMMARY

Systems and methods are described for providing an authenticated stream of content to one or more destination receiver entities. The system may comprise one or more media capturing sources (e.g., cameras, video recording devices, etc.) of a premises (e.g., a home, building, office, warehouse, store, etc.) or an outdoor space (e.g., backyard, park, etc.), and one or more devices and/or services (e.g., destination receiver entities) associated with a network. The devices and/or services may desire to receive the content captured by a media capturing source(s).

The one or more media capturing sources and the one or more receiving devices and/or services may register with a smart premises video group authentication service provided by a network (e.g., a network device) to join a group. Based on registering with the smart premises video group authentication service, the network may generate group information indicating the registered media capturing sources and devices and/or services that joined the group. The smart premises video group authentication service may provide (e.g., via a network device) the group information to a gateway device located at a premises, that is connected to a registered media capturing source(s).

When the registered media capturing source(s) captures content, the media capturing source(s) may send the captured content and associated data (e.g., in a datagram) in a content stream (e.g., a single stream) to a communication device. The communication device may duplicate/copy the stream based in part on the number/quantity of registered devices and/or services and may send a duplicated stream to each of the registered devices and/or services of a group.

In an aspect, methods may comprise receiving information indicating that a media capture source, located at a premises, and one or more destination entities are included in a group. Content comprising a captured image or video and an indication of a destination network address may be received from the media capture source. The destination network address may be associated with the one or more destination entities of the group. The destination network address may be used to determine network addresses of the one or more destination entities. One or more copies of the content may be created. The number of the copies of content may correspond to a number of the one or more destination entities. A respective copy of the copies of the content may be sent to one or more destination entities of the group determined to receive the content.

In another aspect, methods may comprise receiving, from a media capture source, content comprising a captured image or video and an indication of a destination network address. The destination network address may be associated with one or more destination entities of a group. The destination network address may be used to determine one or more network addresses of the one or more destination entities. One or more copies of the content may be created. The number of the copies of content may correspond to a number of the network addresses of the one or more destination entities of the group determined to receive the content. A respective copy of the copies of the content may be sent to one or more destination entities of the group determined to receive the content.

In yet another aspect, methods may comprise receiving one or more requests from a media capture source and one or more destination entities to register with a service and to join a group. Content may be received from the media capture source. The content may comprise a captured image or video and an indication of a destination network address associated with the one or more destination entities of the group. The destination network address may be used to determine one or more network addresses of the one or more destination entities. One or more copies of the content may be created. The number of copies of the content may correspond to a number of the network addresses of the one or more destination entities of the group determined to receive the content. A respective copy of the copies of the content may be sent to one or more destination entities of the group determined to receive the content.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a diagram of an example table illustrating group destination IP addresses and individual destination IP addresses;

FIG. 8 is a diagram of an example table illustrating group destination IP addresses and individual destination IP addresses;

DETAILED DESCRIPTION

Figure 1:
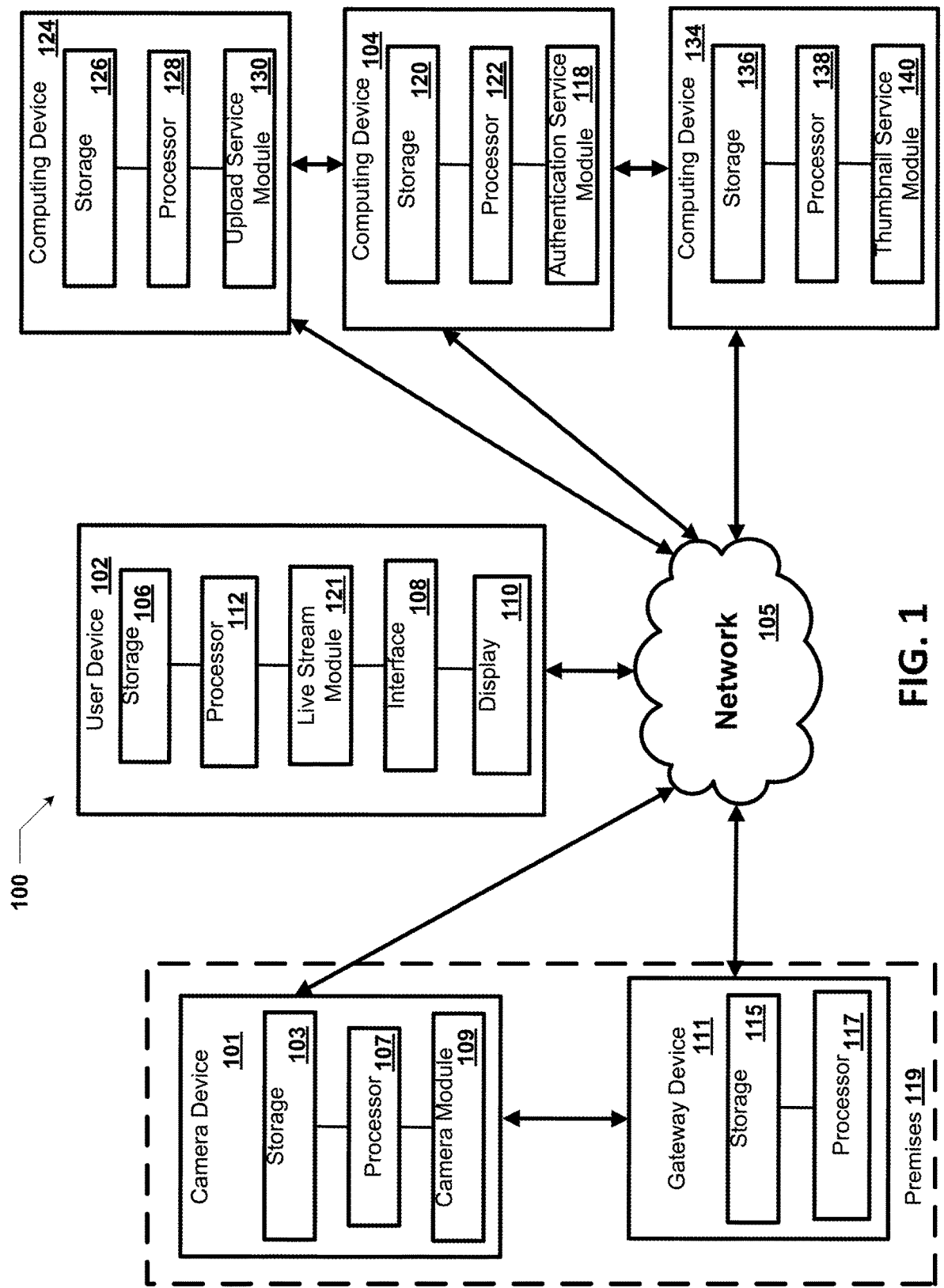
FIG. 1 is a block diagram of an example system and network.

As referred to herein a groupcast may be a stream of one or more copies of content (e.g., an image(s)/video(s) and associated audio) sent to a group of registered receiver entities. In some examples, the copies of content may be sent simultaneously to the group of registered receiver entities. In other examples, the copies of content may be sent at different instances/times to the registered destination receiver entities.

Systems and methods are described for providing an authenticated groupcast stream of content to one or more destination receiver entities. The groupcast stream of content may include a duplicate/copy of content (e.g., an image(s)/video(s)) captured by a media capturing source of a premises.

For instance, the system may comprise one or more media capturing sources (e.g., cameras, video recording devices, etc.) of a premises (e.g., a home, building, office, warehouse, store, etc.) and one or more devices and/or services (e.g., destination receiver entities) associated with a network. The devices and/or services may desire to receive the content captured by a media capturing source(s). The one or more media capturing sources and the one or more devices and/or services (e.g., destination receivers) may register with a smart premises video group authentication service provided by a network (e.g., a network device) to join a groupcast group. Based in part on registering with the smart premises video group authentication service, the network may generate and store group information indicating the registered media capturing sources and devices and/or services that joined the group. The smart premises video group authentication service may provide (e.g., via a network device) the group information to a gateway device located at a premises, that is connected (e.g., via Wi-Fi, Bluetooth, Zigbee, etc.) to a registered media capturing source(s).

In an instance in which the registered media capturing source(s) captures content, the media capturing source(s) may send the captured content and associated data (e.g., a datagram) in a single stream to a communication device (e.g., the gateway device, a network device). The communication device may duplicate/copy the stream based in part on the number/quantity of registered devices and/or services and may send a duplicated stream to each of the registered devices and/or services of a groupcast group.

As pointed out above, in some conventional wireless systems, entities associated with a home network may request content captured from cameras of the home that typically need to simultaneously provide multiple streams of the same captured content to requesting entities. However, generating multiple copies of the same content streams to send simultaneously to different requesting entities may consume the limited computing resources (e.g., processing and memory capacity) of the cameras. Additionally, constraining the computing resources of the cameras by generating multiple streams of the same content may slowdown operation of the cameras and thereby cause the exchange of data (e.g., firmware updates, operating system updates, etc.) between the cameras and other devices across a network to constrain the bandwidth resources of the network.

The systems and methods described herein providing authenticated groupcast stream of content to one or more destination receiver entities (e.g., devices and/or services) may overcome these drawbacks. For example, by utilizing a communication device(s) that duplicates/copies a stream captured by a media capturing source(s) and sends the duplicated stream to a registered/authenticated device(s) and/or service(s), the systems and methods described herein may eliminate a need for a camera to produce multiple streams of content, as exhibited by conventional systems, thereby conserving the processing and memory capacity resources of cameras. Additionally, the destination receiver entities (e.g., devices and/or services) of the systems and methods described herein are not required to establish a peer-to-peer connection to media capturing sources (e.g., cameras), as in some conventional systems, thereby freeing up bandwidth resources in a network.

FIG. 1 illustrates various aspects of an exemplary network in which the present methods and systems may operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 and network may comprise a camera device 101 (also referred to herein as camera 101), a gateway device 111, a user device 102, a computing device 104, a computing device 124 and a computing device 134. The camera device 101 and the gateway device 111 may be located at a premises (e.g., premises 119 such as, for example, a home, a building, etc.). In some examples, the user device 102 may be remote/external to the premises. In other examples, the user device 102 may be located at the premises. The computing devices 104, 124 and 134 may be network devices (e.g., servers) and may be located remote/external to the premises (e.g., premises 119). The camera device 101, gateway device 111, user device 102, computing device 104, computing device 124 and computing device 134 may be in communication with each other via a network 105 such as, for example, a private or public network (e.g., Internet). Other forms of communications can be used, such as wired and wireless telecommunication channels, for example. Although FIG. 1 shows that system 100 includes one camera device 101, one gateway device 111, one user device 102, one computing device 104, one computing device 124 and one computing device 134, it should be pointed out that system 100 may include any suitable number of camera devices 101, gateway devices 111, user devices 102, computing devices 104, computing devices 124 and computing devices 134 without departing from the spirit and scope of the invention.

The camera device 101 (e.g., a camera, a video recording device, etc.) may include a camera module 109 configured to capture one or more images, videos (e.g., captured video of movement within the premises, etc.) and corresponding audio data. The camera device 101 may store, via processor 107, the one or more images, videos and/or audio data in the storage 103. Additionally, the camera device 101 may provide a content stream (e.g., a single stream) of a captured image/video and associated audio to the gateway device 111. The gateway device 111 may copy/duplicate the content stream and may send the copied content stream to receiver entities (e.g., the user device 102, the live stream module 121, the upload service module 130 and/or thumbnail service module 140, as described more fully below.

The gateway device 111 may be a communication device (e.g., a router, a modem) that provides an interface to various entities (e.g., premises devices such as, for example, camera devices 101, radio-frequency (RF) sensors, acoustic devices, home automation devices, computers, mobile devices, etc.) within a premises. The gateway device 111 may be configured to act as a gateway interface between devices (e.g., camera devices 101, etc.) of the premises (e.g., premises 119) and one or more network devices (e.g., computing device 104, computing device 124, computing device 134, etc.).

The gateway device 111 may be coupled to one or more camera devices 101 and may receive (e.g., via a single stream) one or more captured images and/or videos, as well as associated audio and other data from a camera device 101, which may be stored, via processor 117, in storage 115. The captured images/videos and associated audio may be viewable on a display of the gateway device 111. The one or more camera devices 101 may be in communication with the gateway device 111 wirelessly (e.g., WiFi, Bluetooth, Zigbee, etc.) or via other connections (e.g., a wireless local area network (WLAN), etc.).

The gateway device 111 may be configured to communicate with the computing device 104, the computing device 124, the computing device 134 as well as the user device 102 via a network (e.g., network 105 such as, for example, a wide area network (WAN), a cellular network). Broadband communication may be provided by coupling the gateway device 111 with the wide area network, such as a provider network or the Internet. In some examples, the gateway device 111 may be configured with a cellular network transceiver that permits communication with a cellular network. The cellular network may provide access to the computing device 104, the computing device 124, the computing device 134 and/or user device 102. The gateway device 111 may not be limited to providing gateway functionality via cellular and dwelling-based routers and modems. The gateway device 111 may be configured with other network protocol controllers, such as a controller configured for Worldwide Interoperability for Microwave Access (WiMAX) satellite-based broadband, a controller configured for direct telephone coupling, and the like.

In some examples, the gateway device 111 may determine (e.g., via processor 117) a number of receiver entities registered for an authentication service (also referred to herein as smart premises video group authentication service or smart home video group authentication service) and may copy, based on a number/quantity of registered receiver entities, a content stream of an image(s)/video(s) received from a camera device 101. The gateway device 111 may send a content stream of one or more copies (also referred to herein as a groupcast stream) of the image/video received from the camera device 101 to the group of registered receiver entities (e.g., the user device 102, the live stream module 121, the upload service module 130, the thumbnail service module 140), as described more fully below.

In some examples, the gateway device 111 may send an image(s)/video(s) streamed/received from the camera device 101 to the computing device 104. In some other examples, the computing device 104 may receive a content stream of an image(s)/video(s) (and associated audio) from the camera device 101. The computing device 104 may determine a number of receiver entities registered for the authentication service and may duplicate/copy the content stream based on the number/quantity of registered receiver entities. The computing device 104 may send duplicated copies of the content stream to each of the registered receiver entities (e.g., the user device 102, live stream module 121, the upload service module 130, the thumbnail service module 140), as described more fully below.

The user device 102 may be a communication device such as, for example, a computer, a smartphone, a laptop, a smart tablet, a set top box, or other device configured to communicate with the gateway device 111, the computing device 104, the computing device 124 and the computing device 134. The user device 102 may receive and/or transmit content between the gateway device 111, the computing device 104, the computing device 124 and the computing device 134.

The user device 102 may comprise an interface 108 such as a user interface or an application programming interface (API). As an example, the interface 108 may be configured to provide a visual presentation (e.g., via display 110), audio presentation, interactive communication, and the like. The interface 108 may comprise one or more interface elements that may comprise a keypad, menu, icon, user-selectable button, drop-down, slider bar, input field, and the like. One or more of the interface elements may be configured to receive a selection or input from a user.

The user device 102 may comprise a live stream module 121 (also referred to herein as live stream service 121, live stream service application 121 or live stream service app 121). The user device 102 may be able to display content (e.g., live content of an image(s)/video(s) and associated audio data) being streamed to the user device 102 (e.g., via the live stream module 121) captured by a media capturing source (e.g., camera device 101). The user device 102 may store (e.g., via processor 112) the content captured from one or more media capturing sources in storage 106.

In some examples, based on detected input (e.g., keypad input) from a user via the interface elements, the user device 102 may register (e.g., sign up) with an authentication service module (e.g., authentication service module 118) of computing device 104 as a receiver entity (e.g., destination entity) of a designated group for receipt of content streamed to destination receiver entities (e.g., devices/services registered with the authentication service module 118) of the group. The content streamed may be a duplicate stream of a content stream (e.g., a single stream of content of an image(s)/video(s) and associated data) captured by a media capturing source (e.g., camera device 101) of the group.

The computing device 124 may be a network device (e.g., a server) configured to communicate with gateway device 111, user device 102, computing device 104 and computing device 134, for example, via network 105. The computing device 124 may include an upload service module 130 (also referred to herein as upload service 130) that enables upload of one or more images/videos and associated audio captured from one or more media capturing sources (e.g., camera device 101). The computing device 124 may store (e.g., via processor 128) uploaded images/videos captured from one or more media capturing sources (e.g., camera 101) in storage 126. The images/videos stored in storage 126 may be accessible by a user device (e.g., user device 102) of a user.

The upload service module 130 may be registered with an authentication service module (e.g., authentication service module 118) of computing device 104 as a receiver entity (e.g., a destination receiver) of a group (also referred to herein as groupcast group) for receipt of groupcast content streamed to destination devices/services (e.g., devices/services registered with the authentication service module 118) of the group. The content stream may be a duplicate stream of a single stream of content (e.g., an image(s)/video(s)) captured by a media capturing source (e.g., camera device 101) of the group.

The computing device 134 may be a network device (e.g., a server) configured to communicate with gateway device 111, user device 102, computing device 104 and computing device 124 for example via network 105. The computing device 134 may include a thumbnail service module 140 (also referred to herein as thumbnail service 140) that may provide one or more thumbnail images and/or videos (e.g., reduced size images and/or videos and associated audio) corresponding to one or more original images/videos (e.g., original/larger sized images/videos) captured by a media capturing source (e.g., camera device 101). The computing device 134 may store (e.g., via processor 138) the thumbnail images and/or videos in storage 136. The thumbnail service module 140 may generate (e.g., via processor 138) a summary of the content associated with the one or more thumbnail images and/or videos and the summary may be annotated to the thumbnail images and/or videos.

The thumbnail service module 140 may be registered with an authentication service module (e.g., authentication service module 118) of computing device 104 as a receiver entity (e.g., destination) of a group for receipt of content streamed to destination devices/services (e.g., devices/services registered with the authentication service module 118) of the group. The groupcast content stream may be a duplicate stream of a single stream of content (e.g., an image(s)/video(s)) captured by a media capturing source (e.g., camera device 101) of the group, as described more fully below. In some examples, the update service module 130, the thumbnail service module 140 and/or the live stream module 121 may be integrated in the computing device 104.

The computing device 104 may be a network device such as, for example, a server configured to communicate with the user device 102, the computing device 124, the computing device 134, gateway device 111 and camera device 101. The computing device 104 may include an authentication service module 118 (also referred to herein as smart premises video group authentication service module 118) that may receive one or more requests from one or more media capturing sources (also referred to herein as media capturing devices) (e.g., camera device 101) of a premises (e.g., premises 119) to register with the authentication module 118 as a source of capturing content (e.g., image(s)/video(s) content and associated audio data) for a group (e.g., a groupcast group).

Additionally, the computing device 104 may receive one or more requests from devices/services (e.g., user device 102, live stream module 121, upload service module 130, thumbnail service module 140) to register with the authentication service module 118 as a receiver entity (e.g., a destination receiver) of the group for receipt of content stream captured from a registered media capturing source (e.g., camera device 101).

The computing device 104 may provide group information associated with the group to the gateway device 111. The group information may include, but is not limited to, an indication of a name of the group (e.g., a groupcast group), indications of one or more media capturing sources (e.g., camera device 101) of the group and associated network (e.g., IP) addresses as well as indications of one or more destination receivers (e.g., devices/services, for example, user device 102, upload service module 130, thumbnail service module 140) of the group and associated network (IP) addresses, as described more fully below.

In an instance in which a registered media capturing source (e.g., camera device 101) captures content, the media capturing source may send a content stream (e.g., a single content stream) of the captured content (e.g., video content and associated audio data) to the gateway device 111. The gateway device 111 may analyze the group information received from the computing device 104 and may determine the registered destination devices/services (e.g., user device 102, live stream module 121, upload service module 130, thumbnail service module 140) in the group. The gateway device 111 may duplicate the content of the stream received from the media capturing source (e.g., camera device 101) based on a number/quantity of registered destination devices/services (e.g., user device 102, live stream module 121, upload service module 130, thumbnail service module 140) and may provide the duplicated copies of content to each of the registered destination devices/services of the groupcast group. The gateway device 111 may send the duplicate copies to the registered destination receivers simultaneously.

In some examples, the gateway device 111 may send the content stream (e.g., a single content stream) captured and received from the media capturing source (e.g., camera device 101) to the computing device 104 (e.g., a network device). In some other examples, the media capturing source (e.g., camera device 101) may send the content stream to the computing device. The computing device 104 may determine the registered destination devices/services (e.g., user device 102, live stream module 121, upload service module 130, thumbnail service module 140) in the groupcast group. The computing device 104 may duplicate the content stream received from the media capturing source (e.g., camera device 101) based on a number/quantity of registered destination devices/services (e.g., user device 102, live stream module 121, upload service module 130, thumbnail service module 140) and may provide the duplicated copies of content to each of the registered destination devices/services of the group (e.g., the groupcast group).

Figure 2:
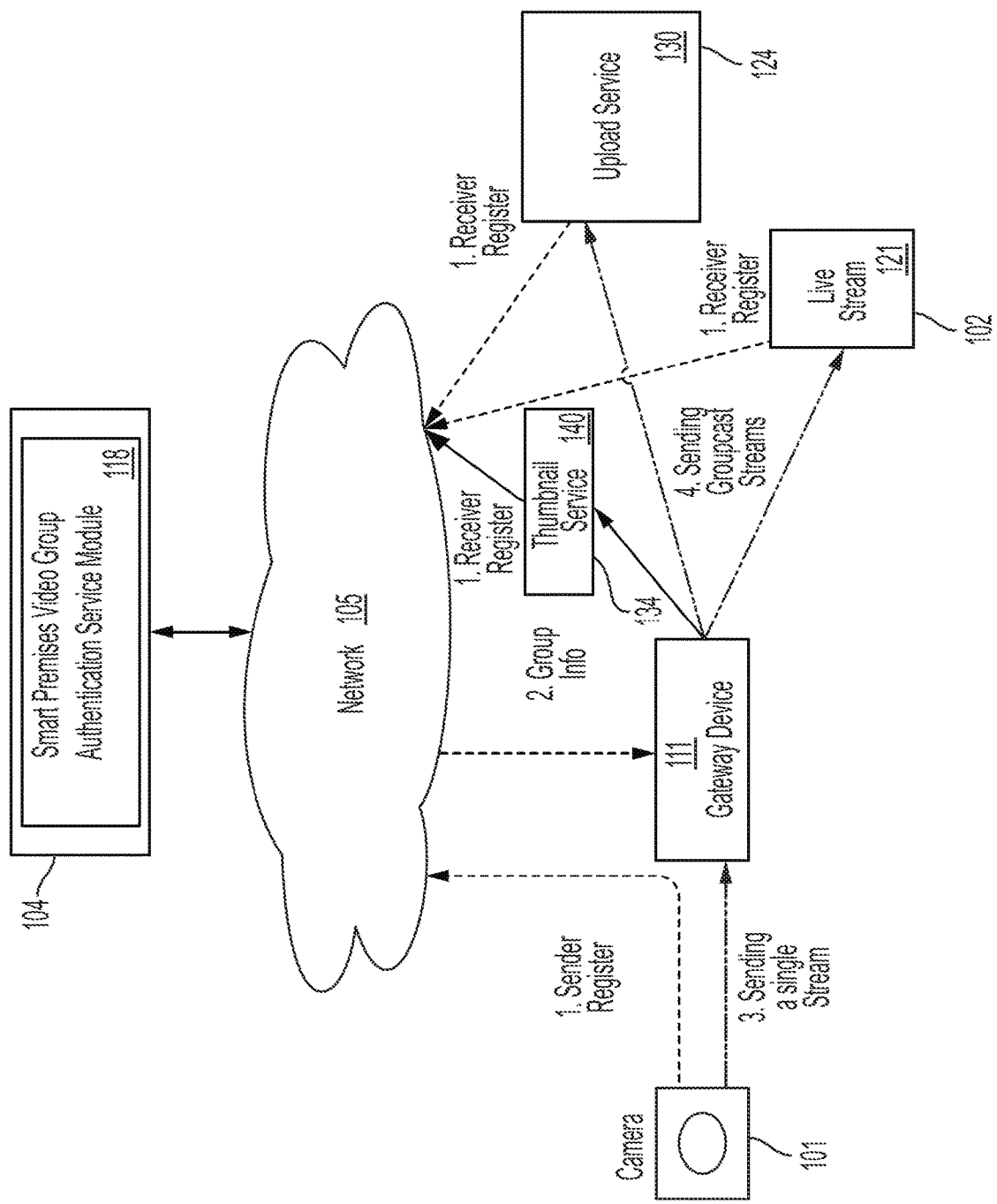
FIG. 2 is a block diagram of an example system.

Referring now to FIG. 2, an exemplary authenticated groupcast system and method is provided. At step 1, one or more media capturing sources (e.g., camera 101) of a premises (e.g., premises 119) and one or more receiving entities (e.g., destination devices/services such as, for example live stream service 121, upload service 130, thumbnail service 140, user device 102, etc.) may register with the smart premises video group authentication service module 118 for inclusion in a designated groupcast group (e.g., a group designated/named as groupcast1). In some examples, the registration of the one or more media capturing sources and receiving entities with the smart premises video group authentication service module 118 may be associated with an account of a user associated with a premises (e.g., premises 119). The account may include a user profile and may include one or more credentials (e.g., a username and/or password to log into the account) that allow the user as well as the media capturing sources and receiving entities to be authenticated to access the smart premises video group authentication service module 118.

An example of a registration request header and body for one or more media capturing sources and one or more destination receiving entities (e.g., devices/services) is provided below, which may include, for example, a service authorization token (SAT) authorizing a service (e.g., the upload service 130, the thumbnail service 140, etc.) to register with, and access, the smart premises video group authentication service module 118 and a JavaScript Object Notation (JSON) Web Token (JWT) authorizing another service (e.g., the live stream service 121) to register with, and access, the smart premises video group authentication service module 118.

```
Header:
{
    Authorization: ${SAT token}/${JWT token},
    ...
}
Body:
{
    type: Service/Device,
    id: Service Unique Name / Device Id,
    destination: true/false,
    privateIPv4: x.x.x.x,
    publicIPv4: x.x.x.x,
    IPv6: xxxx,
    groupName: groupcast1,
    groupIP: x.x.x.233
    ...
}
```

As shown in the body of the registration request above, the type of service(s)/device(s) (e.g., upload service 130, thumbnail service 140, live stream service 121, user device 102, etc.) as well as associated identifiers (e.g., an identifier (Id) associated with a Service Unique Name and/or Device Id) may be included. The designated group name (e.g., groupcast1) of the groupcast group that the one or more media capturing sources and receiving entities are requesting to join may also be included in the registration request.

At step 2, the gateway device 111 may receive/fetch group information from the smart premises video group authentication service module 118. For purposes of illustration and not of limitation, an example of the group information received by the gateway device 111 from the smart premises video group authentication service module 118 is provided below.

```
                    Group Information
{
    groupName: groupcast1,
    groupIP: x.x.x.233 (private IP within reserved IP ranges)
    groupSources: [
        {
            sourceName: camera1,
            sourceIPv4: x.x.x.x (private IP only),
            sourceIPv6: xxxx
        },
        {
            sourceName: camera2,
            sourceIPv4: x.x.x.x(private IP only),
            sourceIPv6: xxxx
        },
        ...
    ],
    groupDestinations: [
        {
            destinationId: 1,
            destinationName: thumbnail service,
            destinationIPv4: x.x.x.x (Public IP),
            destinationIPv6: xxxx
        },
        {
            destinationId: 2,
            destinationName: my-user device,
            destinationIPv4: x.x.x.x (Public IP),
            destinationIPv6: xxxx
        },
        ...
    ]
}
```

As indicated above, the group information received by the gateway device 111 from the smart premises video group authentication service module 118 may indicate to the gateway device 111 one or more media capturing sources (e.g., camera 101) and one or more destination receiver entities (e.g., destination devices/services such as, for example, a thumbnail service, a user device, etc.) that registered with the smart premises video group authentication service module 118.

The group information received by the gateway device 111 may also indicate that the registered media capturing sources and registered destination receiver entities are part of the same groupcast group (e.g., designated/named as groupcast1) and that the registered media capturing sources and registered destination entities share the same group network subnet address (e.g., the same group IP subnet address such as, for example, x.x.x.233).

At step 3, a registered media capturing source (e.g., camera 101) may send content of a captured image(s)/video(s) and associated audio and a datagram (e.g., a video datagram) in a content stream (e.g., a single content stream) to the gateway device 111. The datagram sent from the media capturing source (e.g., camera 101) to the gateway device 111 may have the data structure shown in FIG. 3.

Figure 3:
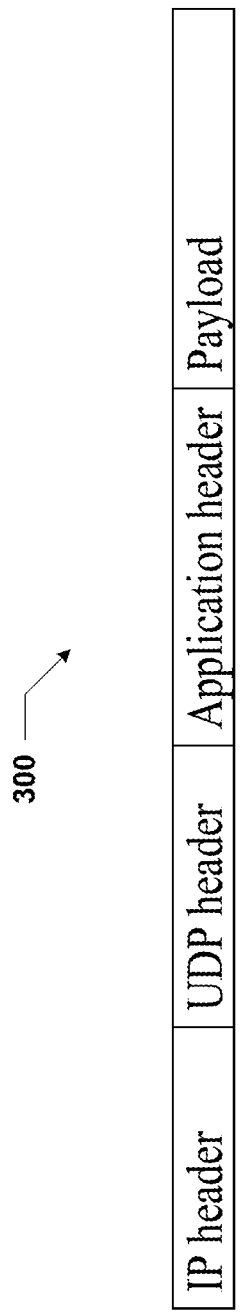
FIG. 3 is a diagram of an example data structure of a datagram.
Figure 4:
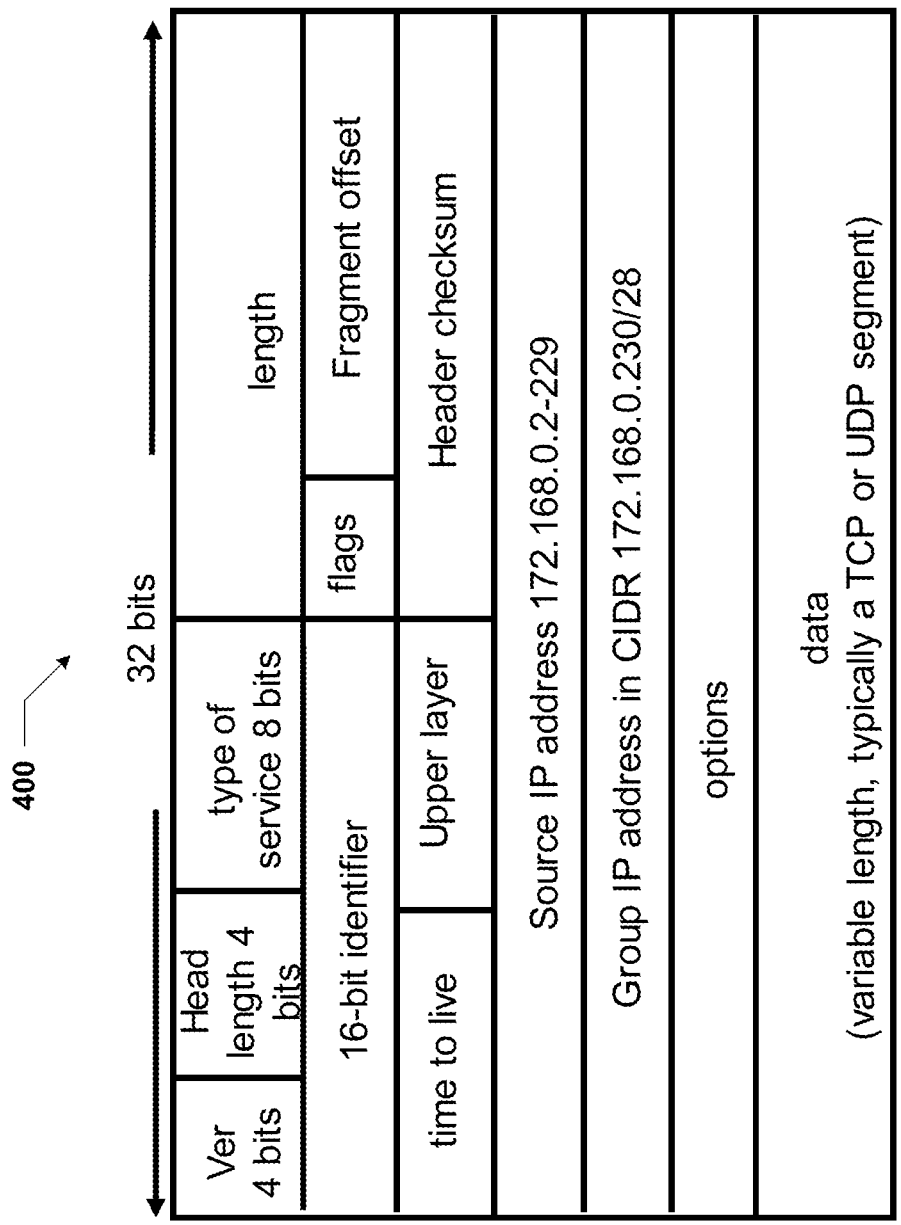
FIG. 4 is diagram of an example Internet Protocol (IP) header of a datagram.

As shown in FIG. 3, the datagram has a data structure 300 including an IP header, a User Datagram Protocol (UDP) header, an application header and a payload. Referring to FIG. 4, an example IP header of a datagram is shown. The IP header 400 of the datagram, generated by the registered media capturing source (e.g., camera 101), may have a new designated configuration for the group IP address associated with Classless Inter-Domain Routing (CIDR) and the options data.

With respect to the destination Group IP address portion of the IP header 400, instead of including a normal individual destination IP address (e.g., a public IP address), the registered media capturing source (e.g., camera 101) may include a private group IP address (e.g., 172.168.0.230/28) in the IP header 400. The private group IP address may be associated with a private network (e.g., a home network, a business network, etc.).

The gateway device 111 may reserve the private IP CIDR from x.x.x.230/28 as private group IP addresses for groupcast groups. For example, in an instance in which the gateway device 111 has its own private IP address as 172.168.0.1, when another device connects to the gateway device 111, the other device may be assigned, by the gateway device 111, any local (e.g., private) IP address from 172.168.0.2-172.168.0.229. The other private IP addresses from 172.168.0.230-172.168.0.255 may be reserved, by the gateway device 111, as the group IP addresses (e.g., for groupcast groups).

Figure 5:
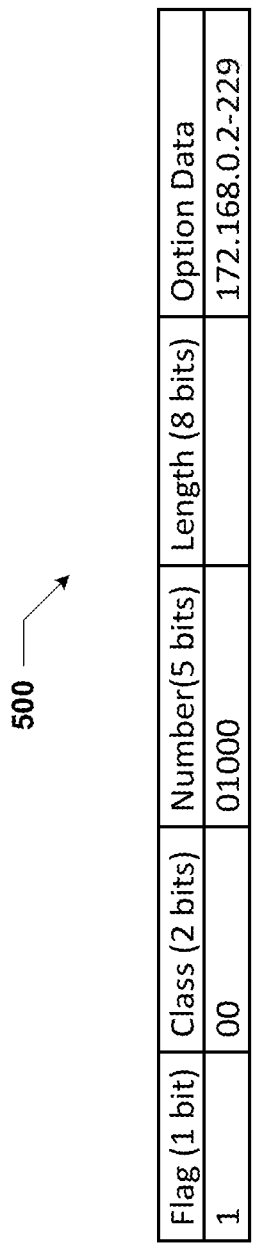
FIG. 5 is a diagram of an example data structure of options data of an IP header.

The options data of the IP header 400 may have the data structure 500 shown in FIG. 5. The gateway device 111 may generate a network address translation (NAT) table for the group IP addresses. The gateway device 111 may run/execute a loop to check each instance of a group IP address(es) in the NAT table and may translate the group IP addresses to corresponding individual destination IP addresses as shown in the table 600 of FIG. 6.

In the example of FIG. 6, a group of destination receiver entities associated with a designated groupcast group (e.g., groupcast1) may share the same group IP address (e.g., 172.168.0.233) corresponding to individual destination IP addresses (e.g., 69.252.80.75, 96.114.14.140, 71.230.36.162) associated with the destination receiver. For purposes of illustration and not of limitation, as an example, individual destination IP address 69.252.80.75 may be associated with a destination service such as, for example, thumbnail service 140, individual destination IP address 96.114.14.140 may be associated with a destination service such as, for example, upload service 130, and individual destination IP address 71.230.36.162 may be associated with a destination device such as, for example, user device 102.

FIG. 6 may also relate to a destination receiver entity associated with another designated groupcast group (e.g., groupcast2) that may share the same group IP address (e.g., 172.168.0.235) corresponding to one or more individual destination IP addresses (e.g., 68.87.41.40 associated with a destination service such as, for example, live stream service 121) of a destination receiver(s) entity of the group.

In an instance in which there are N individual destination IP addresses, for example, the group destination length=N in the group information (e.g., received from smart premises video group authentication service module 118), then N copies of a datagram (e.g., a datagram received from a media capturing source (e.g., camera 101) may be generated, for example, by the gateway device 111 and/or computing device 104) and the respective individual destination IP addresses may be designated to replace the corresponding group IP addresses in an IP header (e.g., IP header 400).

In this regard, in the example of FIG. 6, the gateway device 111 may determine that N=3 since there are 3 individual destination IP addresses (e.g., 69.252.80.75, 96.114.14.140, 71.230.36.162) for the group IP address 172.168.0.233. As such, the gateway device 111 may generate 3 (e.g., N=3) copies of the datagram received in the content stream (e.g., a single content stream) from a registered media capturing source (e.g., camera 101).

Referring to back FIG. 2, at step 4, the gateway device 111 may send/stream a copy (e.g., a groupcast stream) of a datagram to each destination receiver entity. As an example, the gateway device 111 may determine the destination receiver entities (e.g., destination service(s)/device(s)) in the datagram (e.g., video datagram) received from a media capturing source(s) (e.g., camera 101) and may duplicate the datagram to generate multiple copies (N=3) for the destination receiver entities. The gateway device 111 may then send/stream the copy of the datagram to each destination receiver entity (e.g., thumbnail service 140, upload service 130, user device 102) of a designated groupcast group (e.g., groupcast1).

In some examples, the computing device 104 (e.g., a network device) may determine the destination receiver entities (e.g., destination service(s)/device(s)) in the datagram streamed from a media capturing source(s) (e.g., camera 101) and may duplicate the datagram to generate multiple copies (N=3) for the destination receiver entities. The computing device 104 may stream a copy of the datagram to each destination receiver entity (e.g., thumbnail service 140, upload service 130, user device 102) of the designated groupcast group (e.g., groupcast1).

As an example of providing an authenticated groupcast stream of content to one or more destination receivers consider the following. A camera (e.g., a new camera such as, for example, camera 101) may be added to a premises (e.g., premises 119) and connected (e.g., via WiFi, Bluetooth, etc.) to a gateway device (e.g., gateway device 111). The gateway device may assign a new private IP address such as, for example, 172.168.0.5 to the camera. The camera may be connected to a network (e.g., network 105) and in response to connecting with the gateway device and may register (e.g., a provider premises registration) with an account of a user associated with a premises (e.g., premises 119). The account may be maintained by a content provider (e.g., a cable provider, a satellite provider, etc.) providing services (e.g., home security, TV subscription, Internet, etc.) to the premises (e.g., premises 119). Based on registering with the account of the user associated with the premises, other devices associated with (e.g., other registered devices) the account may be informed by a computing device (e.g., computing device 104) that a new device such as, for example, the camera (e.g., camera 101) is included in, or associated with, the account of the user.

The camera may also generate a registration request to register with a smart premises video group authentication service, which is also associated with the account of the user, to join a groupcast group (e.g., a new groupcast group). The smart premises video group authentication service may be provided by the smart premises video group authentication service module 118. The camera may generate and send a registration request (e.g., a Hypertext Transfer Protocol (HTTP) post request) to the smart premises video group authentication service module 118.

An example of the registration request generated and sent by the camera to the smart premises video group authentication service module 118 is as follows.

```
Header:
{
    Authorization: ${JWT token},
    ...
}
```

The JWT token includes the encrypted camera device id, account id.

```
Body:
{
    type: Device,
    id: 6641230860435111412,
    destination: false,
    privateIPv4: 172.168.0.5,
    publicIPv4: 71.230.36.162,
    IPv6: 2601:45:8100:c1d:1ea:2408:1a6:5cf9,
    groupName: groupcast1,
    groupIP: null
    TTLs: 3600
}
```

The groupIP null may denote that this is a new group request and the smart premises video group authentication service module 118 may send a new group private IP response to the camera. The destination may be identified in the registration request as false since this is a new group request and no destination receiver entity may have registered to join the new group yet. An example of the response sent by the smart premises video group authentication service module 118 to the camera (e.g., camera 101) is as follows.
Response:
HTTP status code=200
Response Body={groupIP: 172.168.0.233: state: 0}

The camera may receive the response from the smart premises video group authentication service module 118. The state value may be a number to identify a number/quantity of destination receiving entities (e.g., destination devices/services) that have joined the group. In this example, since this is a request to join a new group, the state value is 0 denoting to the camera that there are no destination receiving entities that have joined this group yet.

The smart premises video group authentication service module 118 may send an updating event to a queue which may be received by (or otherwise listened to by) one or more services or devices of a network (e.g., network 105). The updating event may trigger one or more of the services and/or devices to register to the new group as a destination receiving entity associated with the account of the user.

As an example, the updating event may trigger a service such as, for example, an upload service 130 to register to join the new group (e.g., a groupcast group) as a destination receiving entity to receive groupcast stream. In this example, the upload service module 130 may generate a registration request (e.g., a HTTP post request) including a header and body as follows.

```
Header:
{
        Authorization: ${SAT token},
...
}
Body:
{
    type: Service,
    id: 2908757376510572177,
    destination: true,
    privateIPv4: null
    publicIPv4: 96.114.14.140,
    IPv6: 2601:45:8100:c1d:1ea:2408:1a6:5ffc,
    groupName: groupcast1,
    groupIP: 172.168.0.233
    TTLs: 3600
}
```

The SAT token in the registration request, generated by the upload service 130, may be a service to service authorization token which may include a service id associated with the upload service 130. In the post body, the type is indicated as "service" and the id may be the service account id of the user (e.g., a user associated with a premises such as, for example, premises 119). The service account id may be an encrypted account id that may be one-to-one mapped to the account id of the user associated with the smart premises video group authentication service module 118. The privateIPv4 is null since this is a service. The group IP address is "172.168.0.233" which may be identified, by the upload service module 130 from the updating event in the queue. The destination may be identified as true since the upload service 130 is requesting registration as a destination receiving entity (also referred to herein as destination receiver entity).

In an instance in which the service registration succeeds, a response (e.g., a HTTP response) with a status code may be returned/sent from the smart premises video group authentication service module 118 to the upload service 130. In this example, the response (e.g., a HTTP response) body may indicate {groupIP: 172.168.0.233: state: 1} denoting that the registered upload service 130 has a group destination IP address of 172.168.0.233 and a state value of 1 indicating that there is one destination receiving entity (e.g., the upload service 130) in the group. The smart premises video group authentication service module 118 may also send a broadcast notification to each registered source(s) (e.g., camera 101) and destination receiving entity in the group.

Based on the camera receiving the broadcast notification, the camera may be informed that a new destination receiving entity (e.g., upload service 130) was added to the group. One or more other destination receiver entities (e.g., destination devices and/or services (e.g., thumbnail service 140, live stream service 121, user device 102, etc.) may be added to the group in a similar manner as the upload service 130 described above. For instance, in some examples the updating event sent by the smart premises video group authentication service module 118 may trigger all devices of a predefined type (e.g., cell phones, smart tablets, laptops, etc.) of a network (e.g., e.g., network 105) to register to join the new group as destination receiving entities to receive groupcast stream. When the destination receiving entities (e.g., destination services and/or devices) are set for the group, the camera may capture content (e.g., an image(s)/video(s) and associated audio) and may begin streaming the content.

Figure 7:
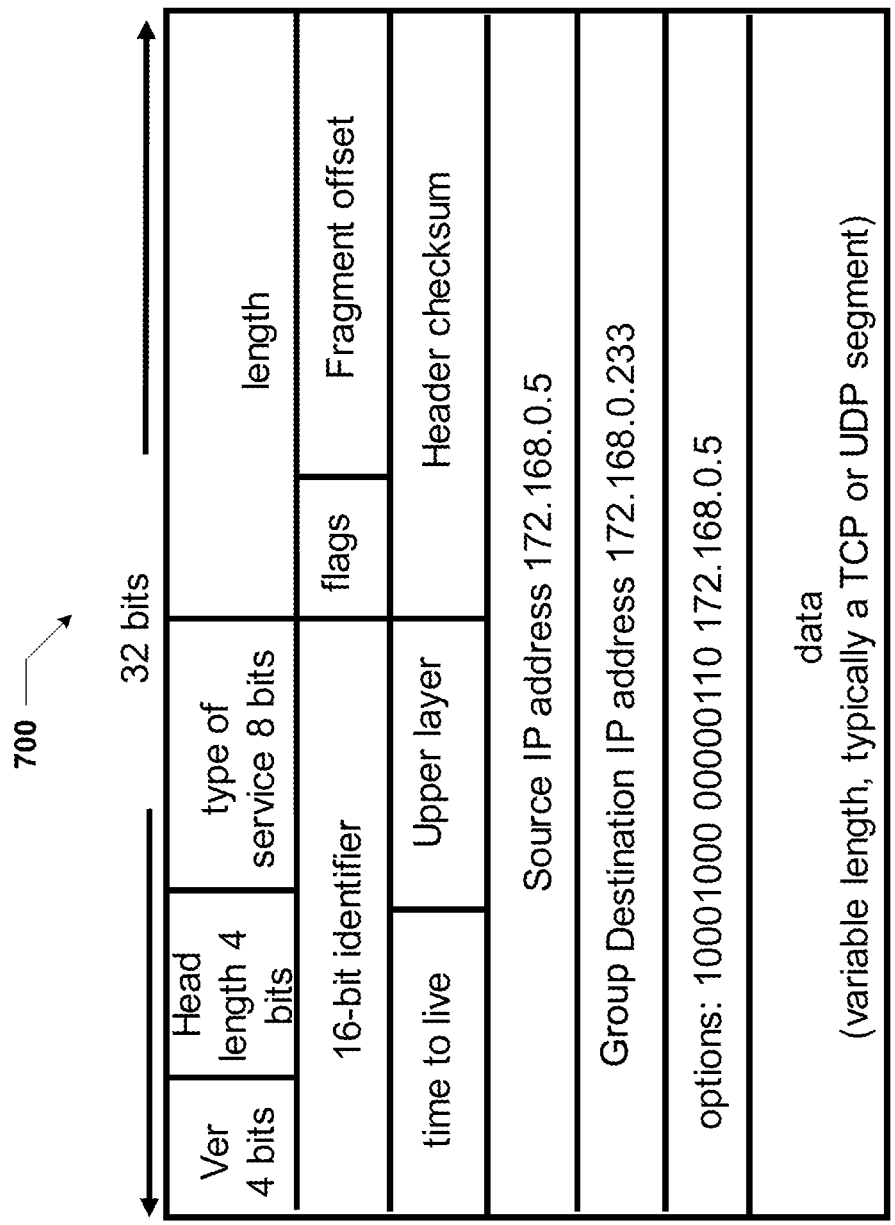
FIG. 7 is a diagram of an example IP header of a datagram.

The camera may provide a content stream (e.g. a single content stream) with a destination indicated as a group destination IP address. The stream may include a datagram (e.g., a video datagram) having an IP header 700 as shown in FIG. 7. As shown in FIG. 7, the group destination IP address is 172.168.0.233. In the options data, the camera may set the first bit as 1 to specify/denote that the options need copying in an instance in which there are fragments (e.g., fragments/segments of a video datagram) to keep such that information is not lost. The fragments that are kept (e.g., stored) may allow a receiver to determine the manner in which to reassemble the fragments into a datagram (e.g., a video datagram). The camera may also set the fifth bit as 1 in the options data to specify that the "172.168.0.5" in the options data is the stream id used to identify the stream source (e.g., camera 101). The "110" in the options data denotes the length of the options (6 bytes in this example) and the options data indicates the source IP address 172.168.0.5 to specify the source (e.g., camera 101) of the stream, as pointed out above. In some examples, the options data may be in a Transport Control Protocol (TCP) segment or an User Datagram Protocol (UDP) segment.

The camera may send the stream to a communication device (e.g., gateway device 111, computing device 104). The communication device (e.g., gateway device 111, computing device 104) may include a network address translator (NAT) configured to translate the group destination IP address (e.g., 172.168.0.5) to one or more individual destination IP addresses (e.g., 69.252.80.75, 96.114.14.140, 71.230.36.162, 68.87.41.40). The communication device (e.g., gateway device 111, computing device 104) may also make/generate multiple copies of a datagram (e.g., video datagram) in the stream, as described more fully below. In some examples, in an instance in which the options data are not set (e.g., the camera set the first bit of the options as 0), the stream received from the camera may be determined by the communication device (e.g., gateway device 111, computing device 104) as a normal single stream without requiring datagram duplications/copies.

The communication device (e.g., gateway device 111, computing device 104) may analyze the options data in an IP header (e.g., IP header 700) of a datagram (e.g., a video datagram) in stream received from the camera and may translate a destination field (e.g., a group IP destination address(es) such as, for example, 172.168.0.233) into one or more individual destination IP addresses as indicated in the data of table 800 (e.g., a NAT table 800) shown in FIG. 8.

Figure 10:
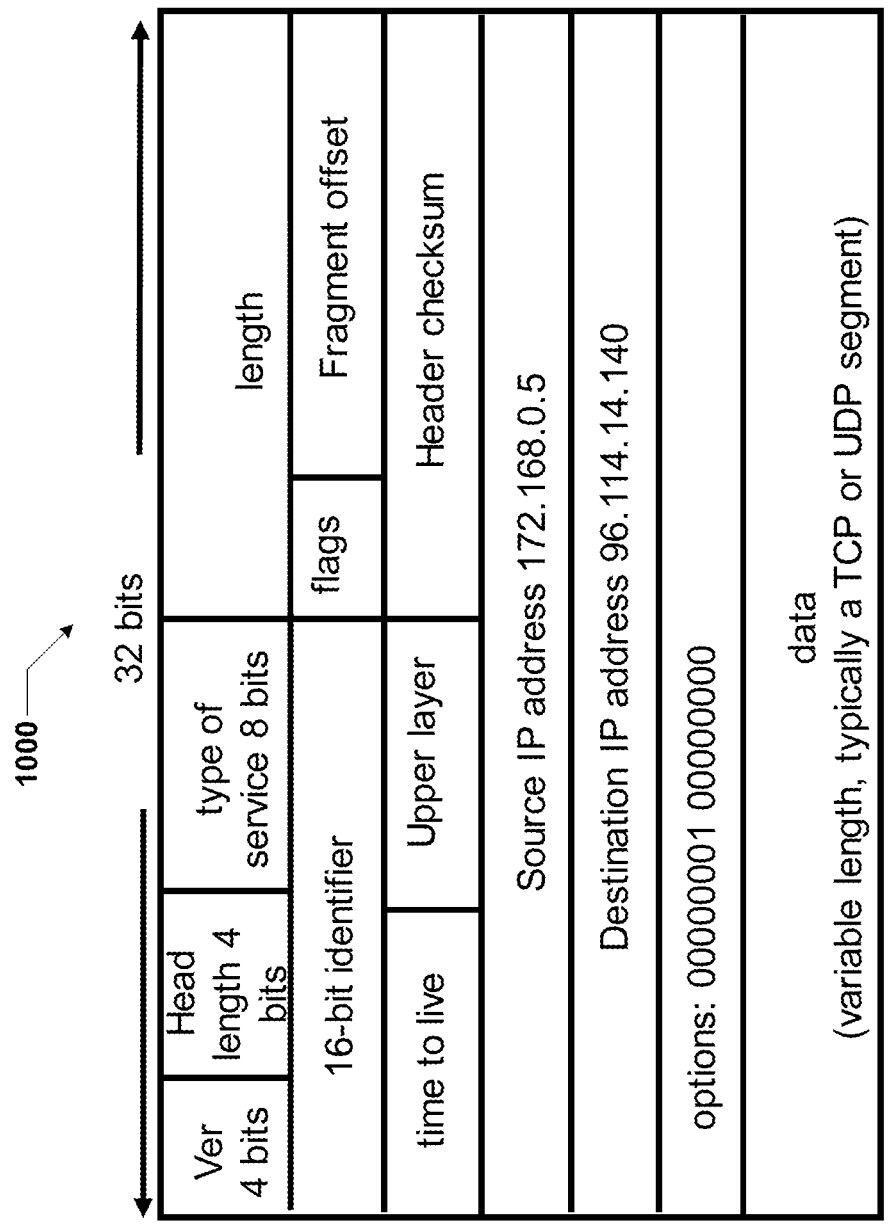
FIG. 10 is a diagram of an example IP header of a datagram.
Figure 11:
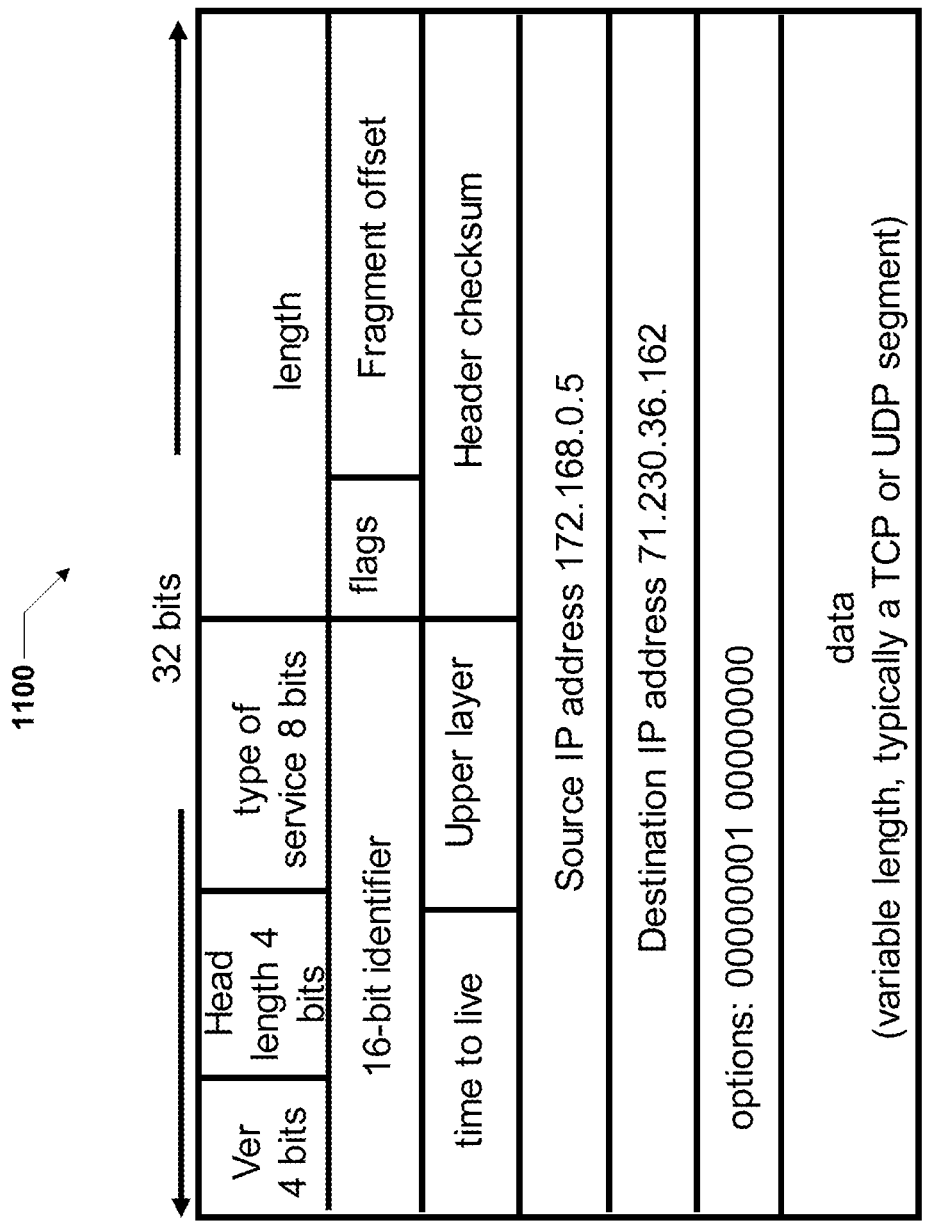
FIG. 11 is a diagram of an example IP header of a datagram.

Based in part on evaluating the data associated with table 800, the communication device (e.g., gateway device 111, computing device 104) may determine that there are three entries/instances associated with the group IP destination address 172.168.0.233. In this regard, the communication device (e.g., gateway device 111, computing device 104) may determine that there are N (e.g., N=3) individual IP destination addresses (e.g., the group destination length=N) and as such the communication device (e.g., gateway device 111, computing device 104) may make/generate three (e.g., N=3) duplicates/copies of a datagram (e.g., a video datagram) received in the stream from the camera. The content (e.g., image(s)/video(s) and associated audio) captured by the camera (e.g., camera 101) may be included in a payload (e.g., the payload of FIG. 3) of the datagram streamed from the camera. The communication device (e.g., gateway device 111, computing device 104) may similarly include the content captured by the camera in the payload of the duplicated datagrams. In generating the duplicates/copies of the datagram, the communication device (e.g., gateway device 111, computing device 104) may replace the group destination IP address (e.g., 172.168.0.233) in an IP header (e.g., IP header 700) of a datagram with a destination IP address (e.g., 69.252.80.75) corresponding to a destination receiving entity (e.g., thumbnail service 140) for each of the duplicated/copied datagrams. Examples of each of the three duplicated datagram IP headers (e.g., IP header 900, IP header 1000, IP header 1100), generated by a communication device (e.g., gateway device 111, computing device 104) are shown in FIGS. 9, 10 and 11.

In the IP headers 900, 1000 and 1100, the options data 00000001 may denote for the set of options data (e.g., 00000001 00000000) that no operations are needed. As such, any additional gateway devices on a path to a destination receiver entity may forward a datagram normally without any additional operations/duplications.

Figure 9:
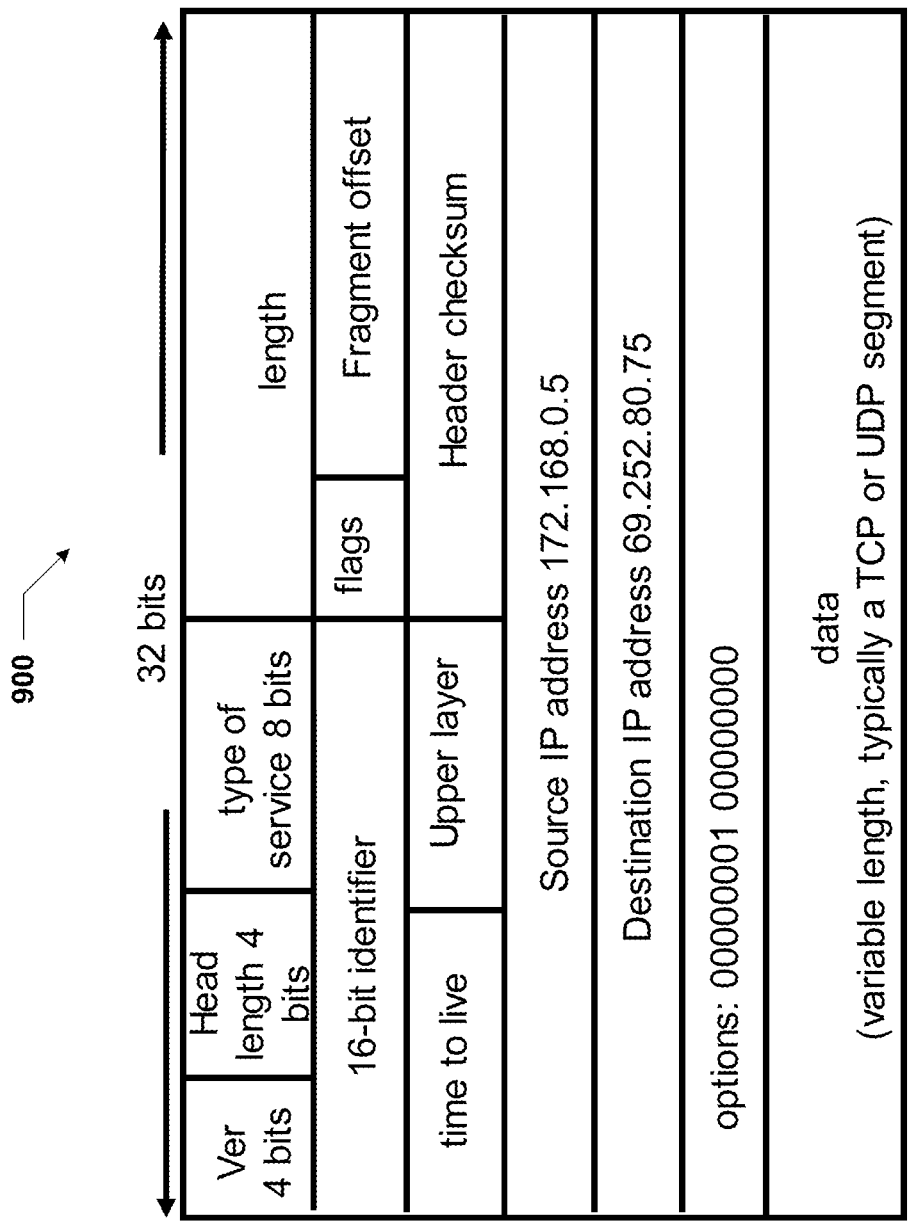
FIG. 9 is a diagram of an example IP header of a datagram.

As shown in FIG. 9, in the IP header 900 the destination IP address is 69.252.80.75, which may correspond to a destination receiver entity such as, for example, thumbnail service 140 of a groupcast group (e.g., groupcast group 1). As shown in FIG. 10, in the IP header 1000 the destination IP address is 96.114.14.140, which may correspond to a destination receiver entity such as for example, upload service 130, of the groupcast group. As shown in FIG. 11, in the IP header 1100 the destination IP address is 71.230.36.162, which may correspond to a destination receiver entity such as, for example, user device 102 of the groupcast group.

The communication device (e.g., gateway device 111, computing device 104) may send each duplicated datagram in a stream (e.g., a groupcast stream) to a corresponding destination (e.g., destination receiver entity). For example, regarding the example above with respect to FIGS. 9-11, the communication device (e.g., gateway device 111, computing device 104) may send a stream with a duplicate datagram (e.g., associated with the datagram sent from the camera) including the IP header 900 to a destination (e.g., destination receiver entity) such as, for example, thumbnail service 140. The communication device (e.g., gateway device 111, computing device 104) may also send a stream with a duplicate datagram (e.g., associated with the datagram sent from the camera) including the IP header 1000 to a corresponding destination (e.g., destination receiver entity) such as, for example, upload service 130. The communication device (e.g., gateway device 111, computing device 104) may also send a stream with a duplicate datagram (e.g. associated with the datagram sent from the camera) including the IP header 1100 to a corresponding destination (e.g., destination receiver entity) such as, for example, user device 102.

Figure 12:
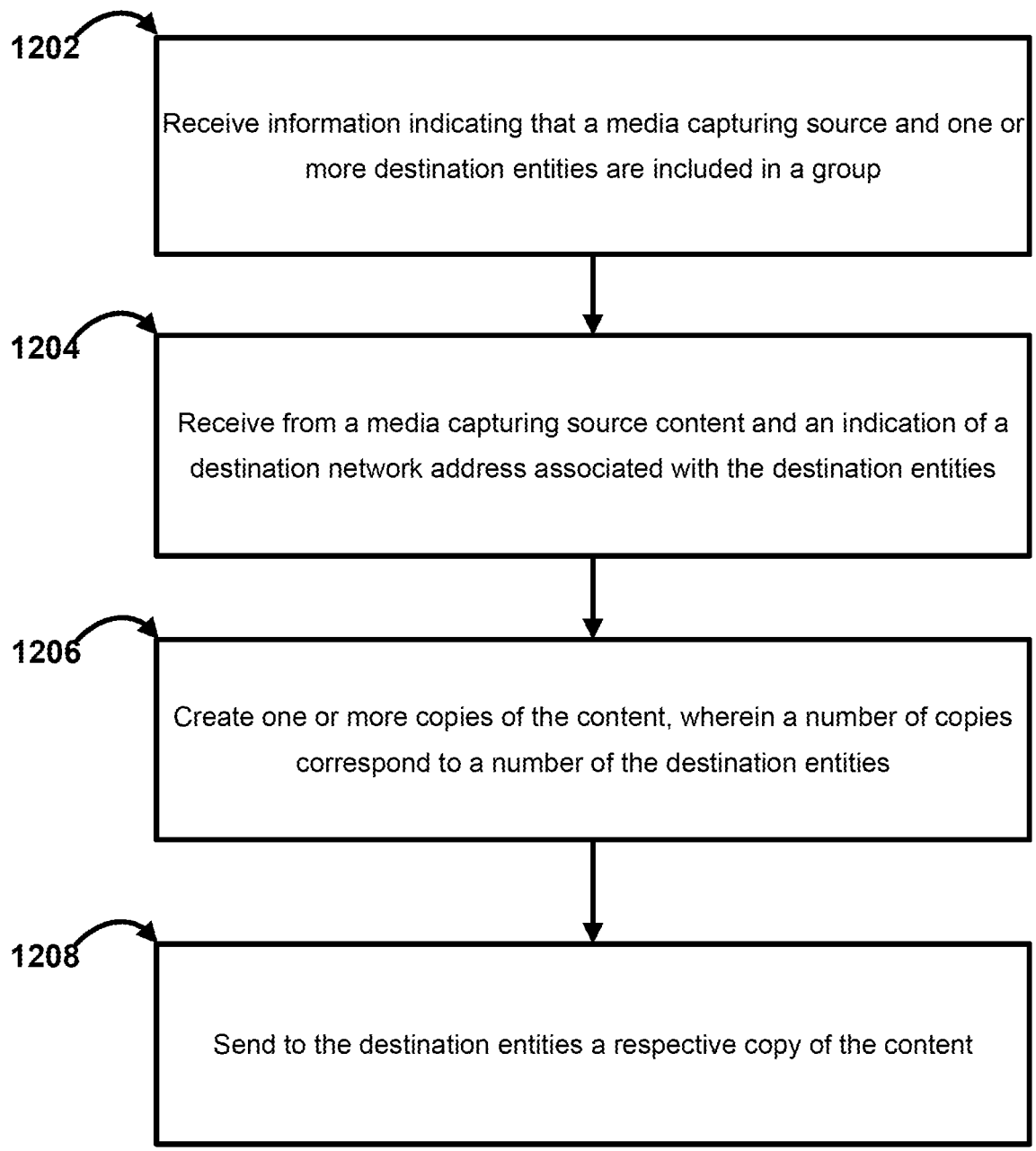
FIG. 12 is a flow chart of an example method.

FIG. 12 illustrates an example method for providing an authenticated groupcast stream of content to destination receivers. In operation 1202, a communication device (e.g., gateway device 111) may receive information (e.g., group information) indicating that a media capture source(s) (e.g., camera 101) located at a premises (e.g., premises 119) and one or more destination entities (e.g., destination devices and/or services such as, for example, user device 102, upload service module 130, thumbnail service module 140, live stream module 121, etc.) are included in a group (e.g., groupcast1). In some examples, the information may be received based on the media capturing source(s) and the one or more destination receiver entities registering with a service (e.g., smart premises video group authentication service module 118).

In operation 1204, a communication device (e.g., gateway device 111) may receive, from the media capture source(s) (e.g., camera device 101), content (e.g., in a datagram) including a captured image and/or video (and associated audio) and an indication of a destination network (e.g., an IP address. The destination network address (e.g., 172.168.0.233) may be associated with the one or more destination entities of the group. The destination network address (e.g., 172.168.0.233) may be used, by the communication device, to determine one or more network addresses (e.g., 69.252.80.75, 96.114.14.140, 71.230.36.162) of the one or more destination entities.

In operation 1206, a communication device (e.g., gateway device 111) may create one or more copies of the content. The number/quantity (e.g., 4) of copies may correspond to a number/quantity (e.g., 4) of the one or more destination entities (e.g., user device 102, upload service module 130, thumbnail service module 140, live stream module 121) of the group determined to receive the content. In operation 1208, a communication device (e.g., gateway device 111) may send to the determined one or more destination entities a respective copy of the copies of the content. The destination network address may be a group private IP address and the respective (e.g., individual) network addresses may be destination private IP addresses. In some examples, the destination entities may relate to devices and/or services. As an example, the services may comprise one or more image or video provision services (e.g., upload service 130, thumbnail service 140, live stream service 121). In other examples, the devices may relate to a type of device (e.g., a cell phone such as, for example, a make/model of a cell phone, a smart tablet such as, for example, a make/model of a smart tablet, a laptop such as, for example, a make/model of a laptop, etc.). In other examples, the devices may be any suitable communication devices irrespective of the type of device.

Figure 13:
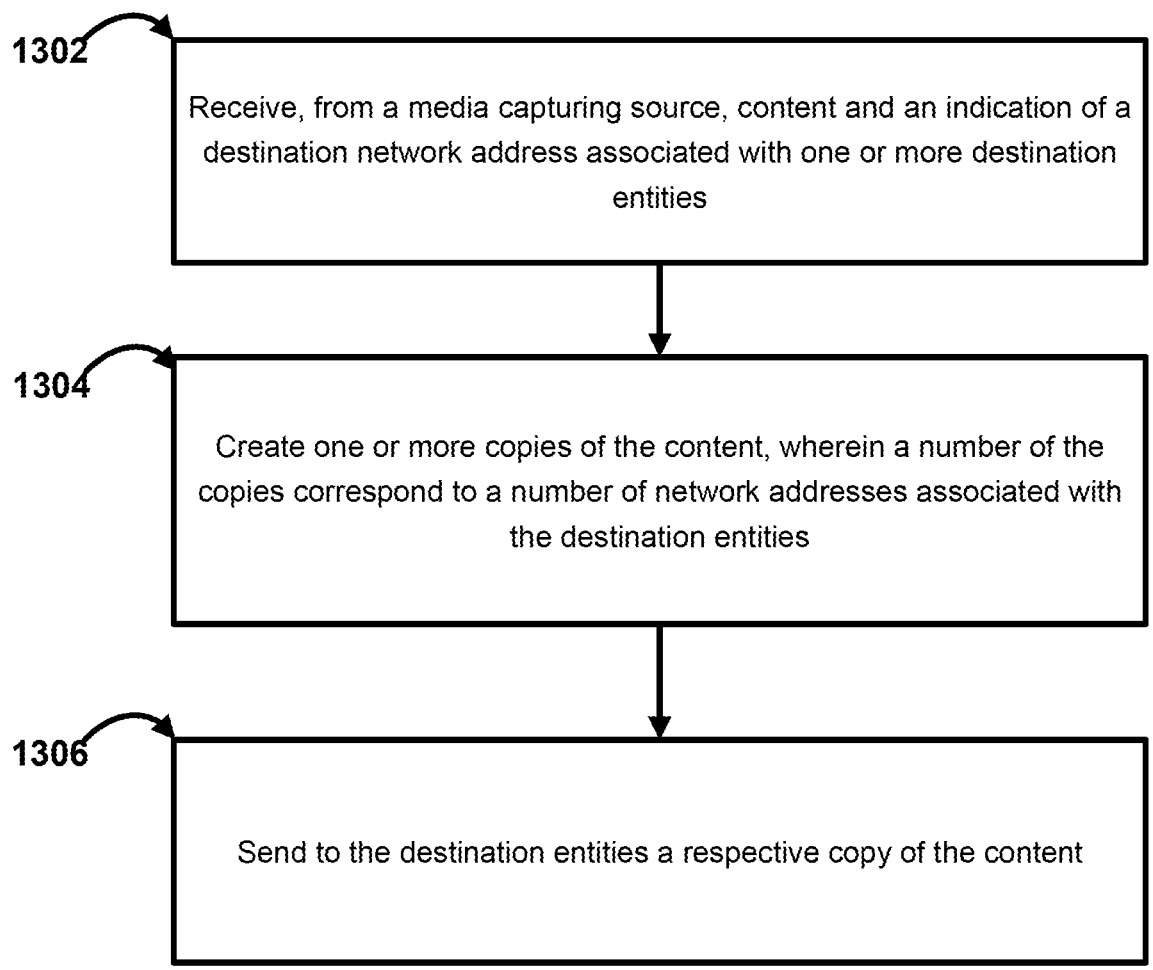
FIG. 13 is a flow chart of an example method.

FIG. 13 illustrates an example method for providing an authenticated groupcast stream of content to destination receivers. In operation 1302, a communication device (e.g., gateway device 111, computing device 104) may receive, from at least one media capture source (e.g., camera device 101), content (e.g., a single stream of content in a datagram) including a captured image and/or video (and associated audio) and an indication of a destination network (e.g., IP) address (e.g., 172.168.0.233) associated with one or more destination entities (e.g., upload service module 130, thumbnail service module 140, live stream module 121) of a group (e.g., groupcast1). The destination network address may be used, by the communication device, to determine one or more network addresses of the one or more destination entities.

In operation 1304, a communication device (e.g., gateway device 111, computing device 104) may create one or more copies of the content. The number/quantity (e.g., 3) of copies may correspond to a number/quantity (e.g., 3) of the network (e.g., IP) addresses of the one or more destination entities of the group determined to receive the content. For purposes of illustration, and not of limitation, the network addresses (e.g., 69.252.80.75, 96.114.14.140, 71.230.36.162) may be associated with one or more destination entities such, as for example, upload service module 130, thumbnail service module 140, live stream module 121, etc.

In operation 1306, a communication device (e.g., gateway device 111, computing device 104) may send to the determined one or more destination entities a respective copy of the copies of the content. In some examples, the communication device may determine the one or more destination entities based in part on analyzing the network addresses associated with the destination entities. For example, analyzing the network addresses may be based on the communication device evaluating data of a NAT table (e.g., table 800 of FIG. 8).

Figure 14:
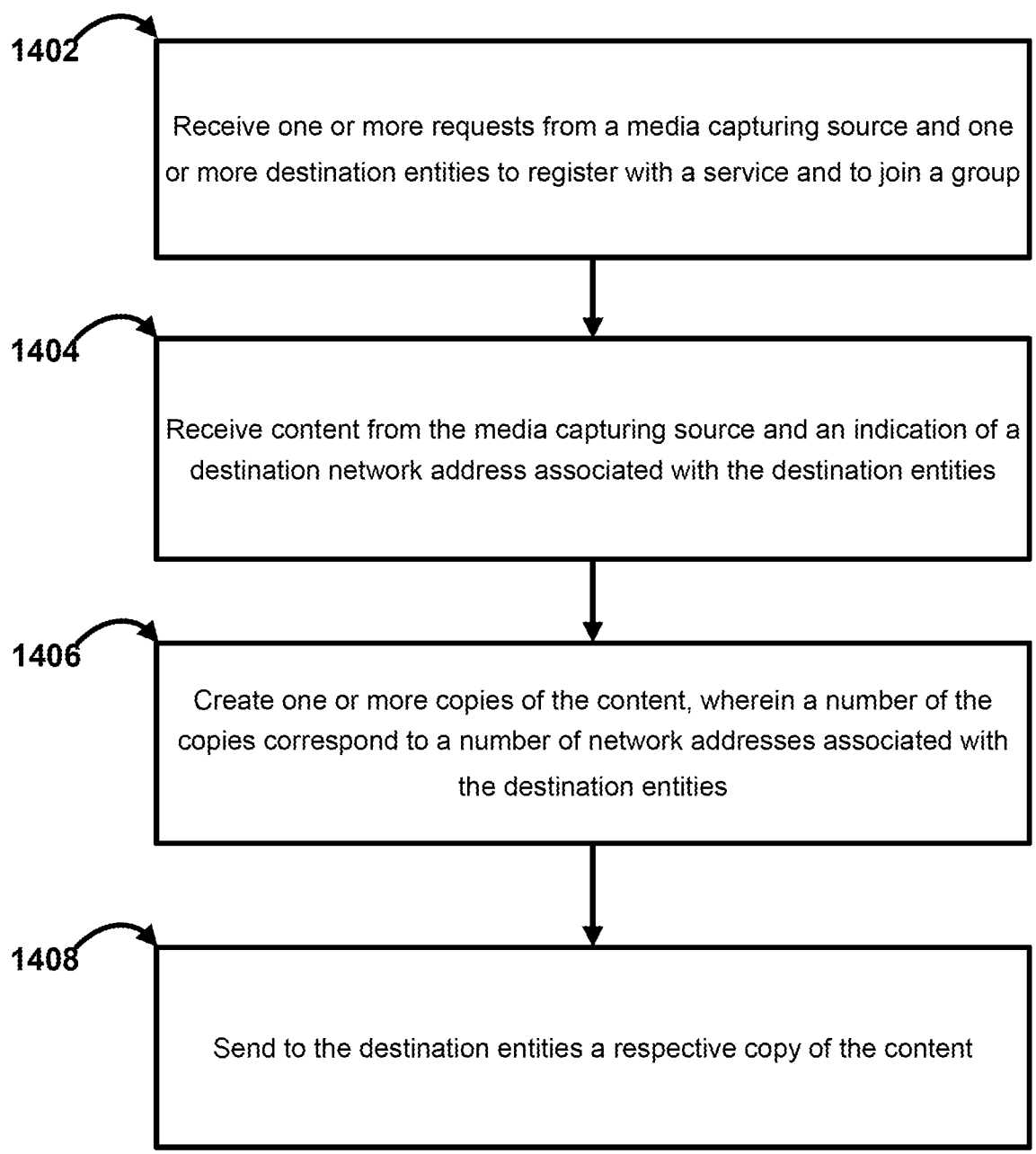
FIG. 14 is a flow chart of an example method.

FIG. 14 illustrates another example method for providing an authenticated groupcast stream of content to destination receivers. In operation 1402, a communication device (e.g., computing device 104) may receive one or more requests (e.g., a HTTP post request) from at least one media capture source (e.g., camera device 101) and one or more destination entities (e.g., upload service module 130, thumbnail service module 140, live stream module 121, user device 102) to register with a service (e.g., smart premises video group authentication service 118) and to join a group (e.g., groupcast1).

In operation 1404, a communication device (e.g., computing device 104) may receive content (e.g., a single stream) captured from the at least one media capture source (e.g., camera 101). In some examples, the communication device (e.g., computing device 104) may receive the content in response to being provided the content from the media capture source(s) (e.g., camera 101). In other examples, the communication device may receive the content in response to being provided the content from another device (e.g., gateway device 111). The content may include, but is not limited to, a captured image or video (and associated audio) and an indication of a destination network address (e.g., in a datagram) associated with the one or more destination entities of the group. The destination network address (e.g., 172.168.0.233) may be used, by the communication device, to determine one or more network addresses of the one or more destination entities.

In operation 1406, a communication device (e.g., computing device 104) may create one or more copies of the content. The number/quantity (e.g., 3) of copies may correspond to a number/quantity of the network addresses (e.g., 69.252.80.75, 96.114.14.140, 71.230.36.162), associated with the one or more destination entities of the group determined to receive the content. The copying of the content may comprise inclusion of a datagram (e.g., a video datagram) including an IP header (e.g., IP header 900, IP header 1000, IP header 1100, etc.), a UDP header, an application header and a payload (e.g., according to the data structure 300 of FIG. 3).

In operation 1408, a communication device (e.g., computing device 104) may send to the determined one or more destination entities a respective copy of the copies of the content. In some examples, the communication device may determine the destination entities based in part on analyzing the network addresses (e.g., 69.252.80.75, 96.114.14.140, 71.230.36.162) associated with the destination entities (e.g., user device 102, upload service module 130, thumbnail service module 140, etc.) For example, analyzing the network addresses may be based on the communication device evaluating data of a NAT table (e.g., table 800 of FIG. 8).

Figure 15:
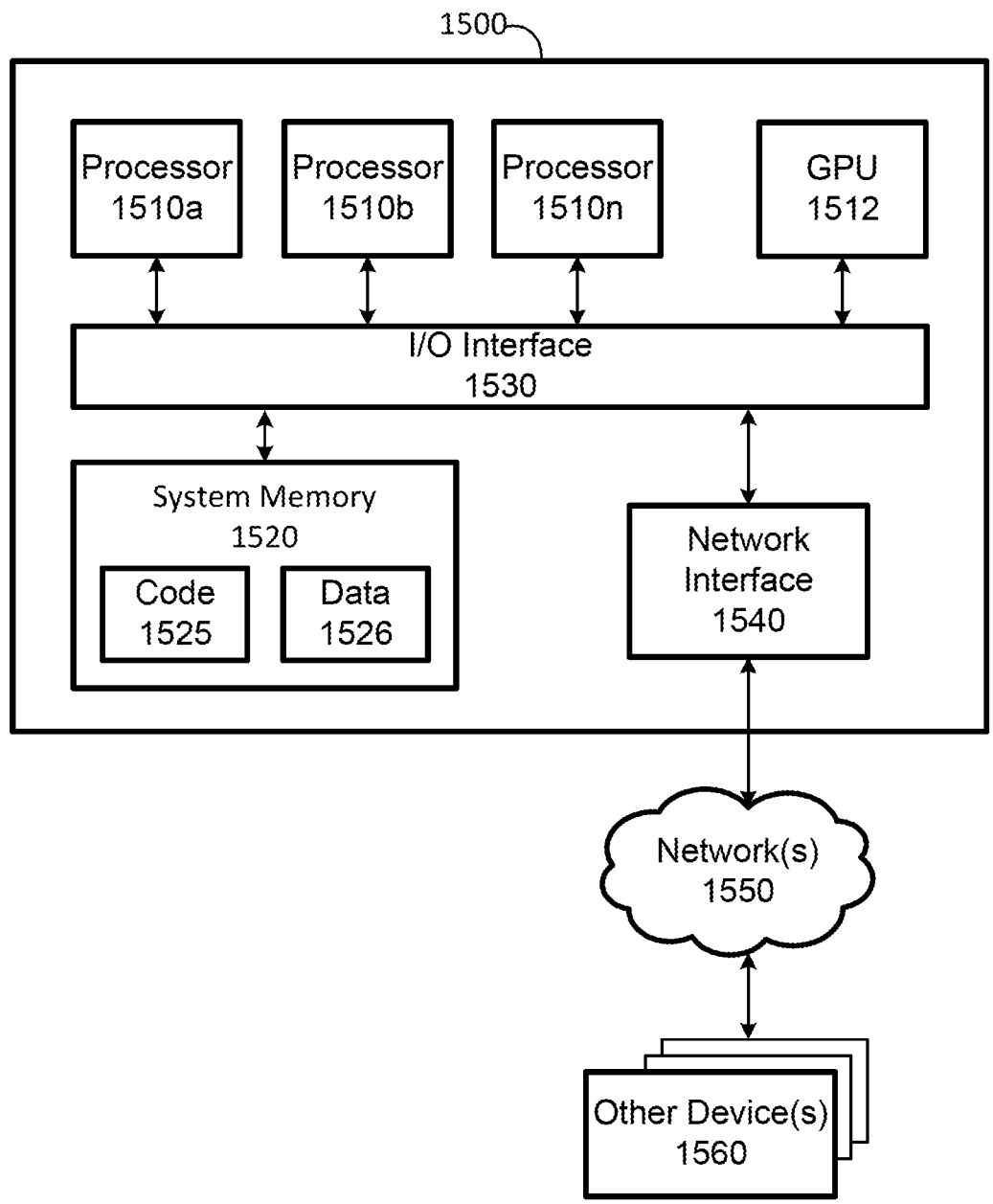
FIG. 15 is a block diagram of an example computing system.

FIG. 15 depicts an example computer system that includes or is configured to access one or more computer-accessible media such as, for example, computing device 1500 capable of executing software for performing operations as described above in connection with FIGS. 1-14. In the illustrated example embodiment, the computing device 1500 may include one or more processors 1510a, 1510b, and/or 1510n (which may be referred herein singularly as the processor 1510 or in the plural as the processors 1510) coupled to a system memory 1520 via an input/output (I/O) interface 1530. The computing device 1500 may further include a network interface 1540 coupled to an I/O interface 1530.

In various embodiments, the computing device 1500 may be a uniprocessor system including one processor 1510 or a multiprocessor system including several processors 1510 (e.g., two, four, eight, or another suitable number). The processors 1510 may be any suitable processors capable of executing instructions. For example, in various embodiments, the processor(s) 1510 may be special-purpose or embedded processors implementing any of a variety of instruction set architectures (ISAs), such as the x86, PowerPC, SPARC, or MIPS ISAs, or any other suitable ISA. In multiprocessor systems, each of the processors 1510 may commonly, but not necessarily, implement the same ISA.

In some embodiments, a graphics processing unit ("GPU") 1512 may participate in providing graphics rendering and/or physics processing capabilities. A GPU may, for example, comprise a highly parallelized processor architecture specialized for graphical computations. In some embodiments, the processors 1510 and the GPU 1512 may be implemented as one or more of the same type of device.

The system memory 1520 may be configured to store instructions and data accessible by the processor(s) 1510. In various embodiments, the system memory 1520 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within the system memory 1520 as code 1525 and data 1526.

In one embodiment, the I/O interface 1530 may be configured to coordinate I/O traffic between the processor(s) 1510, the system memory 1520 and any peripherals in the device, including a network interface 1540 or other peripheral interfaces. In some embodiments, the I/O interface 1530 may perform any necessary protocol, timing or other data transformations to convert data signals from one component (e.g., the system memory 1520) into a format suitable for use by another component (e.g., the processor 1510). In some embodiments, the I/O interface 1530 may include support for devices attached through various types of peripheral buses, such as a variant of the Peripheral Component Interconnect (PCI) bus standard or the Universal Serial Bus (USB) standard, for example. In some embodiments, the function of the I/O interface 1530 may be split into two or more separate components, such as a north bridge and a south bridge, for example. Also, in some embodiments some or all of the functionality of the I/O interface 1530, such as an interface to the system memory 1520, may be incorporated directly into the processor 1510.

The network interface 1540 may be configured to allow data to be exchanged between the computing device 1500 and other device or devices 1560 attached to a network or networks 1550, such as other computer systems or devices, for example. In various embodiments, the network interface 1540 may support communication via any suitable wired or wireless general data networks, such as types of Ethernet networks, for example. Additionally, the network interface 1540 may support communication via telecommunications/telephony networks, such as analog voice networks or digital fiber communications networks, via storage area networks, such as Fibre Channel SANs (e.g., storage area networks), or via any other suitable type of network and/or protocol.

In some embodiments, the system memory 1520 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 1500 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of the computing device 1500 as the system memory 1520 or another type of memory. Further, a computer-accessible medium may include transmission media or signals, such as electrical, electromagnetic or digital signals, conveyed via a communication medium, such as a network and/or a wireless link, such as those that may be implemented via the network interface 1540. Portions or all of multiple computing devices, such as those illustrated in FIG. 15, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving information associated with at least one media capture source, located at a premises, and one or more destination entities;
   authenticating, based on the received information, the at least one media capture source and the one or more destination entities;
   receiving, from the at least one media capture source, content comprising at least one of a captured image or video and an indication of a destination network address associated with the one or more authenticated destination entities, wherein the destination network address is used to determine one or more network addresses of the one or more authenticated destination entities;
   determining a number of copies of the content;
   creating one or more copies of the content based on the determined number of copies; and
   sending to the determined one or more authenticated destination entities a respective copy of the one or more copies of the content.

2. The method of claim 1, wherein creating the one or more copies further comprises:
   replacing, in the copies, the destination network address with a respective network address associated with a corresponding destination entity of the authenticated destination entities.

3. The method of claim 1, wherein creating the one or more copies comprises duplicating the content to create the number of the copies corresponding to the number of the authenticated destination entities determined to receive the content.

4. The method of claim 3, further comprising:
   performing the duplicating based on detecting data in a set of options data in the content indicating to copy the content.

5. The method of claim 1, wherein the received information indicates that the media capture source and the authenticated destination entities are registered with a service.

6. The method of claim 1, wherein determining the network addresses comprises generating a network address translation of the destination network address to respective network addresses associated with the authenticated destination entities.

7. The method of claim 1, wherein receiving information further comprises receiving the information based on the at least one media capture source and the one or more authenticated destination entities generating requests to register with a service and being authenticated by the service to join a groupcast group.

8. The method of claim 4, wherein the content comprises the destination network address and the set of options in a header of a datagram of the content.

9. The method of claim 1, wherein the media capture source comprises a camera device or a video recording device.

10. The method of claim 1, wherein the one or more authenticated destination entities comprise one or more devices or services.

11. The method of claim 10, wherein the services comprise one or more image or video provision services.

12. A method comprising:
    authenticating at least one media capture source and one or more destination entities;
    receiving, from the at least one media capture source, content comprising at least one of a captured image or video and an indication of a destination network address associated with the one or more authenticated destination entities, wherein the destination network address is used to determine one or more network addresses of the one or more authenticated destination entities;
    determining a number of copies of the content;
    creating one or more copies of the content based on the determined number of copies; and
    sending to the determined one or more authenticated destination entities a respective copy of the one or more copies of the content.

13. The method of claim 12, wherein creating the number of copies further comprises:
    replacing, in the copies, the destination network address with a respective network address associated with a corresponding destination entity of the authenticated destination entities.

14. The method of claim 12, further comprising:
    creating the one or more copies based on detecting data in a set of options data in the stream of content indicating to copy the content.

15. The method of claim 12, wherein the computing device is located at the premises.

16. The method of claim 12, wherein the destination network address comprises a destination private Internet Protocol (IP) address and the network addresses comprise destination private IP addresses.

17. A method comprising:
    receiving one or more requests from at least one media capture source and one or more destination entities to register with a service;
    authenticating, based on the received one or more requests, the at least one media capture source and the one or more destination entities;
    receiving content from the at least one media capture source, the content comprising at least one of a captured image or video and an indication of a destination network address associated with the one or more authenticated destination entities, wherein the destination network address is used to determine one or more network addresses of the one or more authenticated destination entities;
    determining a number of copies of the content;
    creating one or copies of the content based on the determined number of copies; and
    sending to the determined one or more authenticated destination entities a respective copy of the one or more copies of the content.

18. The method of claim 17, wherein the at least one media capture source and the one or more destination entities are authenticated by the service.

19. The method of claim 17, wherein creating the one or more copies further comprises:
    replacing, in the copies, the destination network address with a respective network address associated with a corresponding destination entity of the authenticated destination entities.

20. The method of claim 17, further comprising:
    creating the one or more copies based on detecting data in a set of options data in a datagram of the content indicating to copy the content.

21. The method of claim 17, wherein the computing device comprises a network device located external to the premises.

\* \* \* \* \*